(12) United States Patent
Wang et al.

(10) Patent No.: US 11,513,657 B2
(45) Date of Patent: Nov. 29, 2022

(54) METHOD AND APPARATUS FOR CONTROLLING MOVEMENT OF VIRTUAL OBJECT, TERMINAL, AND STORAGE MEDIUM

(71) Applicant: TENCENT TECHNOLOGY (SHENZHEN) COMPANY LIMITED, Shenzhen (CN)

(72) Inventors: Junxiang Wang, Shenzhen (CN); Yizhong Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/359,497

(22) Filed: Jun. 25, 2021

(65) Prior Publication Data

US 2021/0326027 A1    Oct. 21, 2021

Related U.S. Application Data

(63) Continuation of application No. PCT/CN2020/092342, filed on May 26, 2020.

(30) Foreign Application Priority Data

Jun. 5, 2019   (CN) .......................... 201910487940.0

(51) Int. Cl.
*G06F 3/04815* (2022.01)
*G06F 3/0488* (2022.01)
(Continued)

(52) U.S. Cl.
CPC .......... *G06F 3/04815* (2013.01); *A63F 13/42* (2014.09); *G06F 3/0488* (2013.01); *A63F 13/2145* (2014.09)

(58) Field of Classification Search
CPC ............... G06F 3/04815; G06F 3/0488; G06F 3/04845; A63F 13/42; A63F 13/2145
See application file for complete search history.

(56) References Cited

U.S. PATENT DOCUMENTS 6,515,689 B1 * 2/2003 Terashima ............ G06F 3/0485
                                                             345/157
10,146,343 B2 * 12/2018 Sawada ................... G06F 3/041
(Continued)

FOREIGN PATENT DOCUMENTS

CN      105302453 A     2/2016
CN      107577345 A     1/2018
(Continued)

OTHER PUBLICATIONS

The State Intellectual Property Office of the People's Republic of China (SIPO) Office Action 1 for for 201910487940.0 dated Dec. 23, 2020 9 Pages (including translation).
(Continued)

*Primary Examiner* — Justin R. Blaufeld
*Assistant Examiner* — Kenny Nguyen
(74) *Attorney, Agent, or Firm* — Anova Law Group, PLLC (57) ABSTRACT

This application provides a method and an apparatus for controlling movements of a virtual object. The method includes displaying a target perspective picture of a target application, and superimposing a virtual joystick and a movable area of the virtual joystick on the target perspective picture; starting the virtual joystick when a trigger operation corresponding to the virtual joystick is received; adjusting a position of the virtual joystick in the movable area according to a position change of a touch point when the virtual joystick is in an activated state, the position of the virtual joystick and a position of the touch point changing synchronously in real time when the touch point moves within an
(Continued)

effective touch range, the effective touch range being larger than the movable area; and controlling a virtual object to move according to the position of the virtual joystick.

12 Claims, 9 Drawing Sheets

(51) Int. Cl.
    *A63F 13/42* (2014.01)
    *A63F 13/2145* (2014.01)

(56) References Cited

U.S. PATENT DOCUMENTS

| | | | | |
|---|---|---|---|---|
| 10,500,493 | B2* | 12/2019 | Wei | A63F 13/42 |
| 2011/0172013 | A1* | 7/2011 | Shirasaka | A63F 13/92 |
| | | | | 345/173 |
| 2011/0285636 | A1* | 11/2011 | Howard | G06F 3/04883 |
| | | | | 345/173 |
| 2015/0378459 | A1* | 12/2015 | Sawada | G06F 3/041 |
| | | | | 345/173 |
| 2019/0099669 | A1 | 4/2019 | Miao | |
| 2021/0086071 | A1* | 3/2021 | Okamura | G06F 3/016 |

FOREIGN PATENT DOCUMENTS

| | | |
|---|---|---|
| CN | 108404408 A | 8/2018 |
| CN | 110096214 A | 8/2019 |
| EP | 3267300 A1 | 1/2018 |
| JP | 2013061803 A | 4/2013 |
| JP | 2016009473 A | 1/2016 |
| JP | 2019067390 A | 4/2019 |

OTHER PUBLICATIONS

Wolf Funny Commentary, "Stimulation battlefield: you play with two fingers, see how the experts play," Tencent Video, Feb. 21, 2017 (Feb. 21, 2019), Retrieved from the Internet: URL: https://v.qq.com/x/page/o0840z19pnv.html. 1 page.
The World Intellectual Property Organization (WIPO) International Search Report for PCT/CN2020/092342 dated Aug. 26, 2020 6 Pages (including translation).
Japan Patent Office (JPO) The Office Action For JP Application No. 2021-541498 dated Aug. 8, 2022 6 Pages (Translation Included).

* cited by examiner

METHOD AND APPARATUS FOR CONTROLLING MOVEMENT OF VIRTUAL OBJECT, TERMINAL, AND STORAGE MEDIUM

RELATED APPLICATIONS

This application is a continuation of PCT Application No. PCT/CN2020/092342 filed on May 26, 2020, which in turn claims priority to Chinese Patent Application No. 201910487940.0, filed on Jun. 5, 2019 and entitled "METHOD AND APPARATUS FOR CONTROLLING MOVEMENT OF VIRTUAL OBJECT, TERMINAL, AND STORAGE MEDIUM." The two applications are both incorporated herein by reference in their entirety.

FIELD OF THE TECHNOLOGY

Embodiments of this application relate to the field of computer technologies, and in particular, to a method and an apparatus for controlling movements of a virtual object, a terminal, and a storage medium.

BACKGROUND OF THE DISCLOSURE

In an application based on a virtual environment, a user controls a virtual object to move in the virtual environment based on a touch operation on a screen, such as by a drag operation on a virtual joystick in an interface.

SUMMARY

Embodiments of this application provide a method and an apparatus for controlling movements of a virtual object, a terminal, and a storage medium. The technical solutions are as follows:

According to one aspect, this present disclosure provides a method controlling movements of a virtual object. The method includes displaying a target perspective picture of a target application, and superimposing a virtual joystick and a movable area of the virtual joystick on the target perspective picture; starting the virtual joystick when a trigger operation corresponding to the virtual joystick is received; adjusting a position of the virtual joystick in the movable area according to a position change of a touch point when the virtual joystick is in an activated state, the position of the virtual joystick and a position of the touch point changing synchronously in real time when the touch point moves within an effective touch range, the effective touch range being larger than the movable area; and controlling a virtual object to move according to the position of the virtual joystick.

According to another aspect, the embodiments of this application provide an apparatus for controlling movements of a virtual object, including a display module, configured to: display a target perspective picture of a target application, and superimpose a virtual joystick and a movable area of the virtual joystick on the target perspective picture; a starting module, configured to start the virtual joystick when a trigger operation corresponding to the virtual joystick is received; an adjustment module, configured to adjust a position of the virtual joystick in the movable area according to a position change of a touch point when the virtual joystick is in an activated state, the position of the virtual joystick and a position of the touch point changing synchronously in real time when the touch point moves within an effective touch range, the effective touch range being larger than the movable area; and a control module, configured to control a virtual object to move according to the position of the virtual joystick.

According to still another aspect, an embodiment of this application provides a terminal, including a processor and a memory, the memory storing at least one instruction, at least one program, a code set, or an instruction set, the at least one instruction, the at least one program, the code set, or the instruction set being loaded and executed by the processor to implement: displaying a target perspective picture of a target application, and superimposing a virtual joystick and a movable area of the virtual joystick on the target perspective picture; starting the virtual joystick when a trigger operation corresponding to the virtual joystick is received; adjusting a position of the virtual joystick in the movable area according to a position change of a touch point when the virtual joystick is in an activated state, the position of the virtual joystick and a position of the touch point changing synchronously in real time when the touch point moves within an effective touch range, the effective touch range being larger than the movable area; and controlling a virtual object to move according to the position of the virtual joystick.

According to yet another aspect, an embodiment of this application provides a non-transitory computer-readable storage medium, storing at least one instruction, at least one program, a code set, or an instruction set, the at least one instruction, the at least one program, the code set, or the instruction set being loaded and executed by a processor to implement the method for controlling movements of a virtual object described in the foregoing aspect.

In embodiments consistent the present disclosure, after the virtual joystick is started, the position of the virtual joystick in the movable area is adjusted according to the position change of the touch point. In addition, the position of the virtual joystick and the position of the touch point change synchronously in real time when the touch point moves within the effective touch range. Compared with the related art, when the virtual joystick moves by the same distance, the moving distance of the touch point in this application is smaller, which improves operation efficiency of a user.

DESCRIPTION OF EMBODIMENTS

To make the objectives, technical solutions, and advantages of this application clearer, the following further describes implementations of this application in detail with reference to the accompanying drawings.

First, several terms involved in the embodiments of this application are briefly introduced.

A virtual environment is displayed (or provided) by an application when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. A description is made by using an example in which the virtual environment is a three-dimensional virtual environment in the following embodiment, but this application is not limited thereto.

A virtual object is a movable or non-movable object in a virtual environment. The movable object may be at least one of a virtual character, a virtual animal, and a cartoon character. In some embodiments, when the virtual environment is a three-dimensional virtual environment, the virtual object is a three-dimensional model created based on a skeletal animation technology. Each virtual object has a respective shape and size in the three-dimensional virtual environment, and occupies some space in the three-dimensional virtual environment.

A virtual joystick is a control configured to control a virtual object to move in a virtual environment. A user may control movements of the virtual joystick by using a touch operation on a terminal screen, to further control movements of the virtual object. In some embodiments, the virtual joystick may be a circle. In some other embodiments, the virtual joystick may alternatively be a triangle, a square, a hexagon, an octagon, or the like, or may be other irregular shapes, and this is not limited in this embodiment of this application. The virtual joystick moves in a movable area. In some embodiments, a shape of the movable area may be the same as or different from a shape of the virtual joystick. For example, the virtual joystick is a circle, the movable area is also a circle, and the two are concentric circles. In another example, the virtual joystick is a hexagon, the movable area is an octagon, and the centers of the two coincide.

The method for controlling movements of a virtual object provided in this application is applicable to a terminal. The terminal may be a laptop portable computer, a mobile phone, a tablet computer, an e-book reader, a video game console, a Moving Picture Experts Group Audio Layer IV (MP4) player, or the like.

An application based on the virtual environment is installed on the terminal. The virtual environment includes a virtual object. In some embodiments, the application is an application supporting a three-dimensional virtual environment. The application may be any one of a virtual reality application, a three-dimensional map program, a military simulation program, or a game application such as a TPS game, a first-person shooting (FPS) game, a multiplayer online battle arena (MOBA) game, or a multiplayer gunfight survival game. In some embodiments, the application may be a standalone application, such as a standalone 3D game application, or may be a network online application.

In the conventional solution, a touch point of a user finger on a screen can only move in the movable area of the virtual joystick, which is relatively severely limited. To resolve the problem existing in the conventional solution, a method is provided in the related art. That is, when the touch point is outside the movable area of the virtual joystick, the virtual joystick still maintains an activated state. In this case, a connecting line between a position of the touch point and the center of the movable area is obtained, and coordinates of an intersection of the connecting line and an edge of the movable area are determined as a position of the virtual joystick.

In the foregoing related art, when the touch point outside the movable area of the virtual joystick moves in a reverse direction, the position of the virtual joystick remains unchanged while the touch point moves to the edge of the movable area. Once the touch point moves inside the edge of the movable area, the virtual joystick starts to move in a reverse direction. As a result, the operation efficiency of the user is low.

In the technical solution provided in this application, after the virtual joystick is started, the position of the virtual joystick in the movable area is adjusted according to the position change of the touch point. In addition, the position of the virtual joystick and the position of the touch point change synchronously in real time when the touch point moves within the effective touch range. Compared with the related art, when the touch point is outside the movable area of the virtual joystick and the virtual joystick moves by the same distance, the moving distance of the touch point in this application is smaller, which improves operation efficiency of a user.

The technical solution of this application is described below by using several embodiments.

Figure 1:
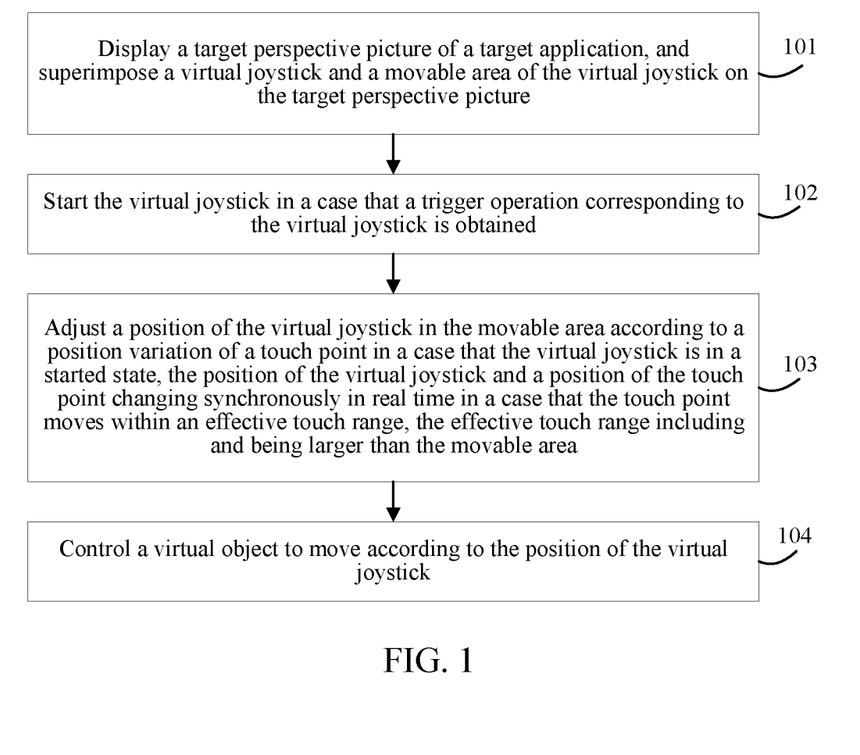
FIG. 1 is a flowchart of a method for controlling movements of a virtual object according to an embodiment of this application.

FIG. 1 is a flowchart of a method for controlling movements of a virtual object according to an embodiment of this application. In this embodiment, descriptions are made mainly by using an example in which the method is applied to the terminal introduced above. The method may include the following steps (101 to 104):

Step 101: Display a target perspective picture of a target application, and superimpose a virtual joystick and a movable area of the virtual joystick on the target perspective picture.

The target application may be an application based on a virtual environment. In some embodiments, the application may be a virtual reality application, a three-dimensional map application, a military simulation program, or a game application, and the game application may be any one of a TPS game, an FPS game, and a MOBA game.

The terminal runs the target application to display the target perspective picture. The target perspective picture is a picture obtained by observing the virtual environment from a target perspective of the virtual object. Alternatively, the target perspective is a perspective of observing the virtual environment by using a first-person perspective of the virtual object, or the target perspective is a perspective of observing the virtual environment by using a third-person perspective of the virtual object.

The virtual joystick and the movable area of the virtual joystick may be superimposed and displayed on the target perspective picture. In addition, the terminal may further display at least one virtual object included in the virtual environment.

The virtual joystick is configured to control a virtual object to move in a virtual environment. For other descriptions of the virtual joystick, reference is made to the brief introduction of the foregoing terms, and details are not repeated herein.

The movable area of the virtual joystick is used for limiting a moving range of the virtual joystick, so that the virtual joystick can only move in the movable area. In some embodiments in an initial state, the virtual joystick is located at the center of the movable area.

In some embodiments, a shape of the movable area may be the same as or different from a shape of the virtual joystick. For example, the virtual joystick is a circle, the movable area is also a circle, and the two are concentric circles. In another example, the virtual joystick is a hexagon, the movable area is an octagon, and centers of the two coincide.

Step 102: Start the virtual joystick when a trigger operation corresponding to the virtual joystick is obtained.

The terminal may detect whether the trigger operation that is performed by the user on the screen and is used for starting the virtual joystick is received. The terminal starts the virtual joystick when obtaining the trigger operation corresponding to the virtual joystick.

In some embodiments, the trigger operation may be a press operation, a single-click/tap operation, a swipe operation, or the like, and this is not limited in this embodiment of this application.

In some embodiments, the terminal may detect a position of the trigger operation by using a touchscreen, that is, a position of a touch point of the user finger on the screen, determine whether the touch point is within a trigger range of the virtual joystick. When the touch point is within the trigger range of the virtual joystick, the terminal starts the virtual joystick according to the trigger operation; and when the touch point is not within the trigger range of the virtual joystick, the terminal does not respond to the trigger operation. The trigger range of the virtual joystick may be the movable area of the virtual joystick, or may be an area larger than the movable area, and this is not limited in this embodiment of this application.

In addition, when detecting that the touch operation performed on the screen disappears, the terminal turns off the virtual joystick.

Step 103: Adjust a position of the virtual joystick in the movable area according to a position change of a touch point when the virtual joystick is in an activated state, the position of the virtual joystick and a position of the touch point changing synchronously in real time when the touch point moves within an effective touch range, the effective touch range including and being larger than the movable area.

When detecting continuous touch operations performed on the screen, the terminal determines that the virtual joystick is in the activated state. In the activated state, the user swipes on the terminal screen to change the position of the touch point. Correspondingly, the terminal may determine a position change of the touch point between two moments, and may further adjust the position of the virtual joystick in the movable area according to the position change of the touch point.

In this embodiment of this application, the position of the virtual joystick and the position of the touch point change synchronously in real time when the touch point moves within the effective touch range, and the effective touch range includes and is larger than the movable area. In some embodiments, the effective touch range may be the entire screen of the terminal, or may be a partial screen area of the terminal, and this is not limited in this embodiment of this application. When the touch point moves within the effective touch range, the position of the virtual joystick changes while the position of the touch point changes. For example, when the position of the touch point is reversed, the position of the virtual joystick is also reversed, and the two change synchronously in real time.

When the touch point moves within the movable area, the position of the virtual joystick is the position of the touch point. When the touch point moves within the effective touch range but outside the movable area, the terminal obtains the position of the virtual joystick through particular calculation according to the position of the touch point.

Step 104: Control a virtual object according to the position of the virtual joystick to move.

After determining the position of the virtual joystick, the terminal may control the virtual object according to the position such as a direction and a distance of the virtual joystick to move.

In some other embodiments, different marks such as an alert mark, a material mark, an attack mark, or a defense mark may be generated according to the position of the virtual joystick. The alert mark is used for alerting the virtual object, or alerting the virtual object to a marked position. The material mark is used for prompting the virtual object that there is material at the marked position. The attack mark is used for prompting the virtual object to start attacking or prompting the virtual object to attack the marked position. The defense mark is used for prompting the virtual object to perform defense.

Figure 2:
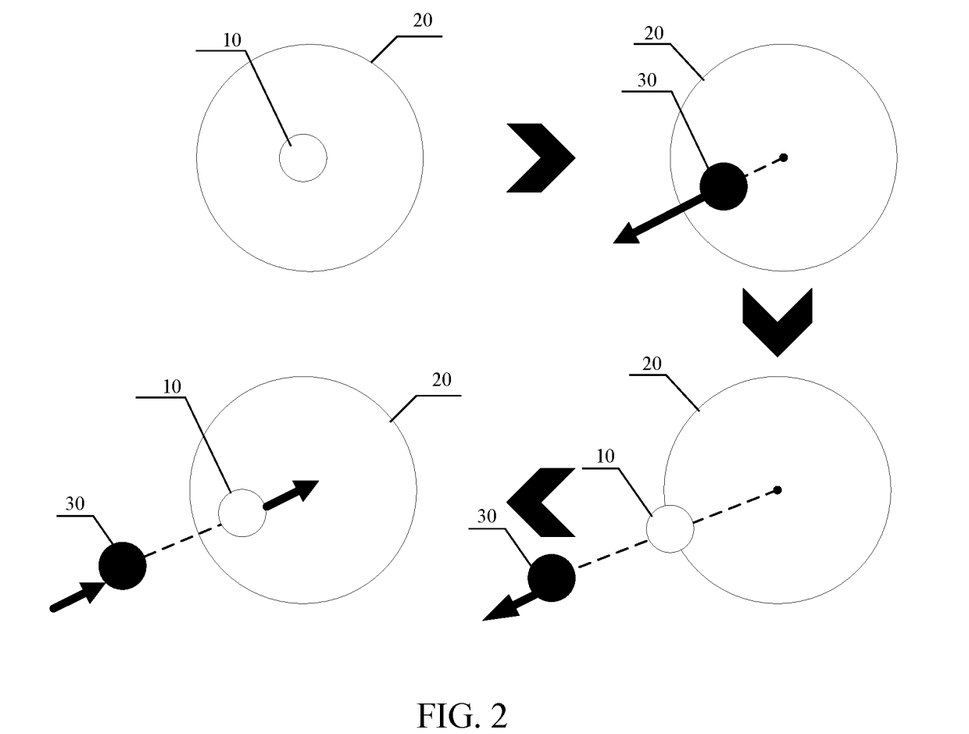
FIG. 2 is a schematic exemplary diagram of a method for controlling movements of a virtual object.

FIG. 2 is a schematic exemplary diagram of a method for controlling movements of a virtual object. An example in which the virtual joystick and the movable area of the virtual joystick are both circles and the touch point moves in a reverse direction is used. As shown in FIG. 2, in an initial state, a virtual joystick 10 is located at the center of a movable area 20. When obtaining a trigger operation corresponding to the virtual joystick 10, the terminal starts the virtual joystick 10; when a touch point 30 moves in the movable area 20, a position of the touch point 30 is the same as a position of the virtual joystick 10; when the touch point 30 moves outside the movable area 20, the virtual joystick 10 moves on an edge of the movable area 20; and when the touch point 30 starts to move in a reverse direction, the virtual joystick 10 located on the edge of the movable area 20 also starts to move in a reverse direction, and the two change synchronously in real time.

Based on the above, in the technical solution provided in this embodiment of this application, after the virtual joystick is started, the position of the virtual joystick in the movable area is adjusted according to the position change of the touch point. In addition, the position of the virtual joystick and the position of the touch point change synchronously in real time when the touch point moves within the effective touch range. Compared with the related art, when the touch point is outside the movable area of the virtual joystick and the virtual joystick moves by the same distance, the moving distance of the touch point in this application is smaller, which improves operation efficiency of a user.

Figure 3:
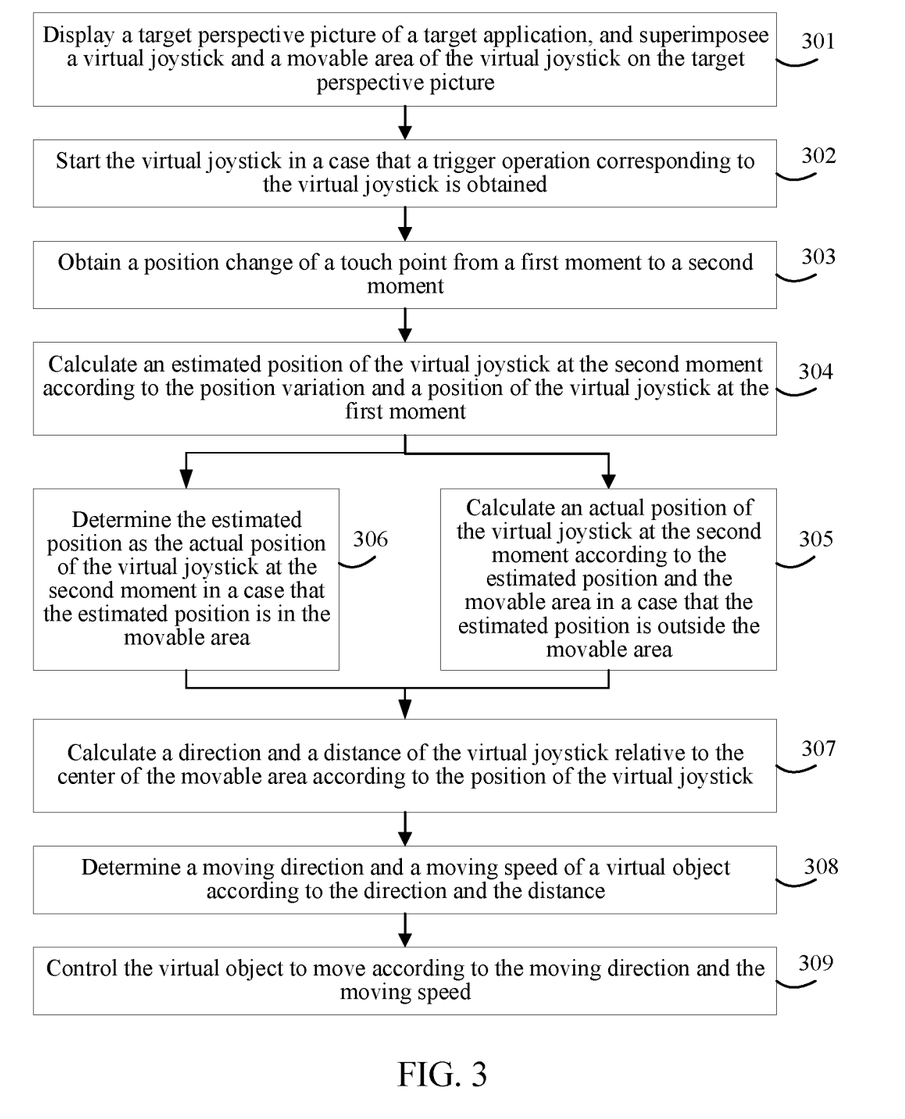
FIG. 3 is a flowchart of a method for controlling movements of a virtual object according to another embodiment of this application.

FIG. 3 is a flowchart of a method for controlling movements of a virtual object according to another embodiment of this application. In this embodiment, descriptions are made mainly by using an example in which the method is applied to the terminal introduced above. The method may include the following steps:

Step 301: Display a target perspective picture of a target application, and superimpose a virtual joystick and a movable area of the virtual joystick on the target perspective picture.

In some embodiments in an initial state, the virtual joystick is located at the center of the movable area.

This step is the same as or similar to step 101 in the embodiment in FIG. 1, and details are not repeated herein.

Step 302: Start the virtual joystick when a trigger operation corresponding to the virtual joystick is obtained.

This step is the same as or similar to step 102 in the embodiment in FIG. 1, and details are not repeated herein.

In some embodiments the terminal may determine in real time whether the virtual joystick is still started. When it is determined that the virtual joystick is still started, the terminal continues to keep the virtual joystick in the activated state; and when it is determined that the virtual joystick is not started, the terminal turns off the virtual joystick.

When the virtual joystick is in the activated state, the following step 303 is performed.

Step 303: Obtain a position change of a touch point from a first moment to a second moment.

The terminal may obtain a position of the touch point in real time, so that the terminal may obtain a position of the touch point at the first moment and a position of the touch point at the second moment, to further obtain the position change of the touch point from the first moment to the second moment. The position change is a vector including a direction and a distance. In some embodiments an interval between the first moment and the second moment is a target duration, and the target duration is not limited in this embodiment of this application.

For example, the position of the touch point at the first moment may be represented as (X1, Y1), and the position of the touch point at the second moment may be represented as (X2, Y2). The position change of the touch point from the first moment to the second moment, that is, a variation of the horizontal coordinate and a variation of the vertical coordinate, may then be represented as (X0, Y0)=(X2−X1, Y2−Y1).

Step 304: Calculate an estimated position of the virtual joystick at the second moment according to the position change and a position of the virtual joystick at the first moment.

The terminal may further obtain the position of the virtual joystick at the first moment. When the touch point moves from the position at the first moment to the position at the second moment, a position of the virtual joystick also changes. Assuming that when the virtual joystick is not limited by the movable area, the virtual joystick can achieve the same position change as that of the touch point, and in this case, the estimated position at the second moment is obtained.

For example, the position of the virtual joystick at the first moment may be represented as (x1, y1), and the position change of the touch point may be represented as (X0, Y0). The estimated position of the virtual joystick at the second moment may then be represented as (A, B)=(x1+X0, y1+Y0). In some embodiments if the first moment is the initial state, the position of the virtual joystick at the first moment may be represented as (0, 0).

In some embodiments the terminal may determine whether the virtual joystick is located in the movable area when the virtual joystick is at the estimated position at the second moment. The terminal then performs the following step 305 when the virtual joystick is located outside the movable area; and performs the following step 306 when the virtual joystick is located in the movable area.

For example, the terminal may calculate a distance between the estimated position of the virtual joystick at the second moment and the center (that is, the origin) of the movable area. If the distance is greater than the movable area, it is considered that the estimated position is outside the movable area; and if the distance is less than or equal to the movable area, it is considered that the estimated position is in the movable area.

An example in which the movable area is a circle with a radius of R is used. The estimated position of the virtual joystick at the second moment may be represented as (A, B). The distance between the estimated position and the center of the movable area may be represented as $r=\sqrt{A^2+B^2}$. When $r \leq R$, it is considered that the estimated position is in the movable area; and when $r>R$, it is considered that the estimated position is outside the movable area.

Step 305: Calculate an actual position of the virtual joystick at the second moment according to the estimated position and the movable area when the estimated position is outside the movable area.

In practice, because the virtual joystick can only move in the movable area, when the estimated position is outside the movable area, the estimated position needs to be mapped to the actual position.

In some embodiments step 305 may include the following two steps:

(1) calculating coordinates of an intersection of a connecting line between the estimated position and the center of the movable area and an edge of the movable area; and (2) determining the coordinates of the intersection as the actual position of the virtual joystick at the second moment.

Figure 4:
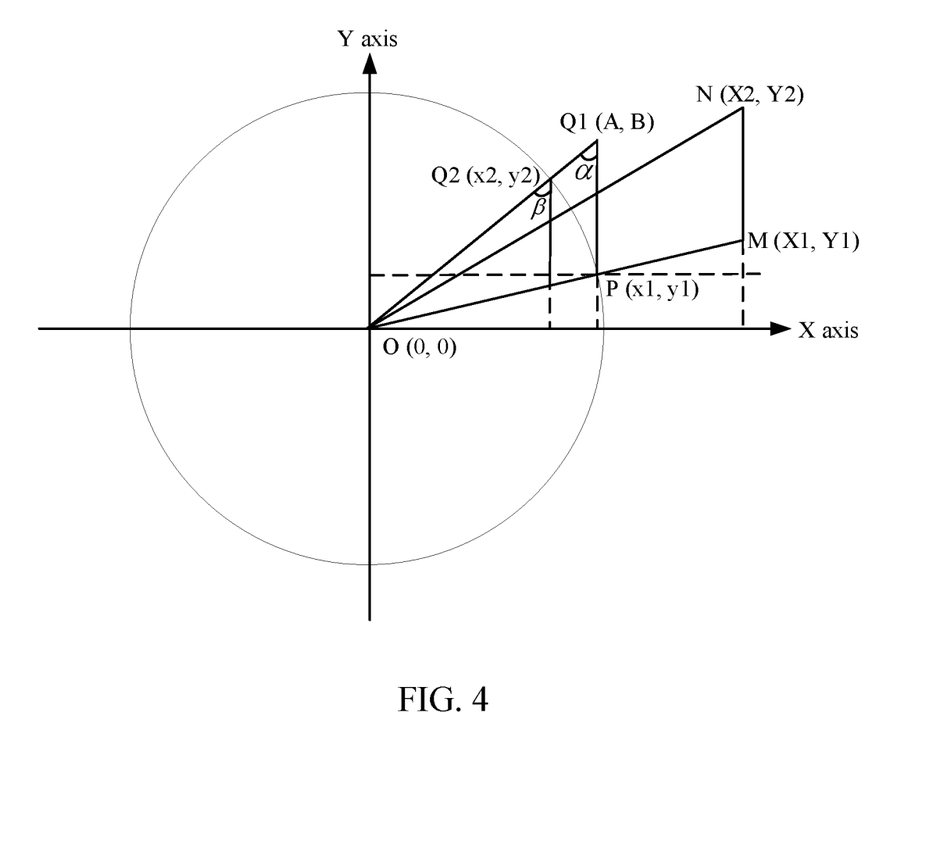
FIG. 4 is a schematic exemplary diagram of calculating an actual position of a virtual joystick at a second moment.

For example, FIG. 4 is a schematic exemplary diagram of calculating an actual position of a virtual joystick at a second moment. An example in which the movable area and the virtual joystick are circles and the radius of the movable area is R is used. The position of the touch point at the first moment is M (X1, Y1), the position of the touch point at the second moment is N (X2, Y2), the position of the virtual joystick at the first moment is P (x1, y1), the estimated position of the virtual joystick at the second moment is Q1 (A, B), and the actual position of the virtual joystick at the second moment is Q2 (x2, y2). According to M (X1, Y1) and N (X2, Y2), the position change of the touch point can be obtained. That is, a variation on the X axis is X0=X2−X1, and a variation on the Y axis is Y0=Y2−Y1. The estimated position of the virtual joystick at the second moment is Q1 (A, B). A=x1+X0, and B=y1+Y0. Correspondingly, the coordinates of the intersection of the connecting line between the estimated position Q1 (A, B) and the center O (0,0) of the movable area and the edge of the movable area are Q2 (x2, y2). x2=R*SINβ, and y2=R*COSβ. According to a geometric principle, β=α=arctan(A/B), that is x2=R*SIN(arctan(A/B)), y2=R*COS(arctan(A/B)). Further, the coordinates of the intersection Q2 (x2, y2) are determined as the actual position of the virtual joystick at the second moment.

Step 306: Determine the estimated position as the actual position of the virtual joystick at the second moment when the estimated position is in the movable area.

The terminal directly determines the estimated position as the actual position of the virtual joystick at the second moment when the estimated position is in the movable area.

Step 307: Calculate a direction and a distance of the virtual joystick relative to the center of the movable area according to the position of the virtual joystick.

The terminal may calculate the direction and the distance of the virtual joystick relative to the center of the movable area after obtaining the foregoing actual position of the virtual joystick at the second moment.

Step 308: Determine a moving direction and a moving speed of a virtual object according to the direction and the distance.

Further, the terminal determines the moving direction and the moving speed of the virtual object according to the direction and the distance of the virtual joystick. The direction of the virtual joystick may be mapped to the moving direction of the virtual object, and the distance of the virtual joystick may be mapped to the moving speed of the virtual object. When the distance is larger, the moving speed of the virtual object is higher.

Step 309: Control the virtual object according to the moving direction and the moving speed to move.

After the moving direction and moving speed are obtained, the virtual object is controlled to move in the virtual environment, for example, walk, run, or jump.

Based on the above, in the technical solution provided in this embodiment of this application, it is determined whether the estimated position of the virtual joystick is in the movable area, and when the estimated position is outside the movable area, the coordinates of the intersection of the connecting line between the estimated position and the center of the movable area and the edge of the movable area are determined as the actual position of the virtual joystick at the second moment. In the technical solution provided in this embodiment of this application, a moving distance of the touch point is smaller when the operation is completed, that is, a swipe distance of the user finger is smaller, which further improves the operation efficiency of the user.

Figure 5:
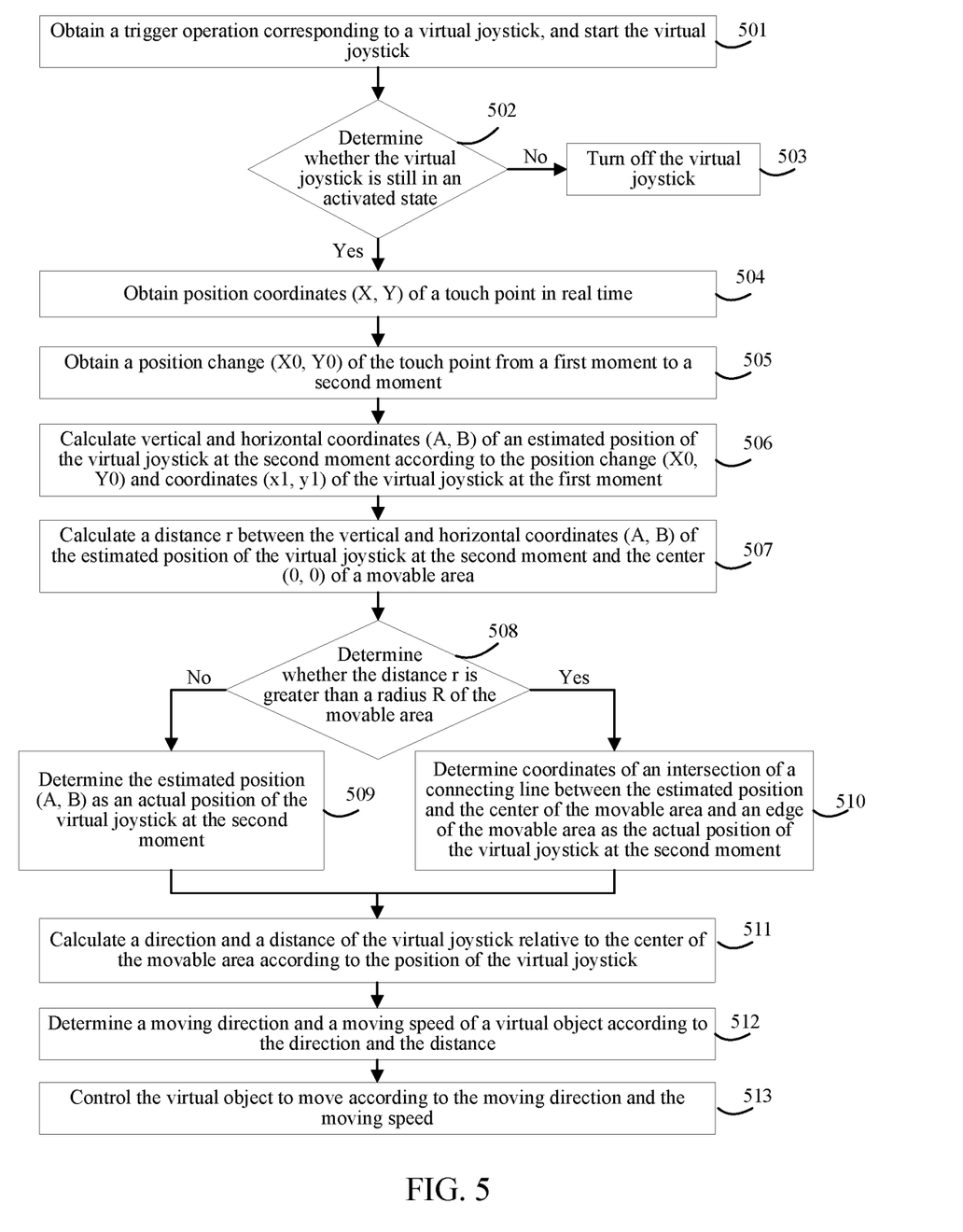
FIG. 5 is an exemplary flowchart of a method for controlling movements of a virtual object.

Below, FIG. 5 is an exemplary flowchart of a method for controlling movements of a virtual object.

Step 501: Obtain a trigger operation corresponding to a virtual joystick, and start the virtual joystick.

Step 502: Determine whether the virtual joystick is still in an activated state.

When the virtual joystick is not in the activated state, the following step 503 is performed; and when the virtual joystick is still in the activated state, the following step 504 is performed.

Step 503: Turn off the virtual joystick.

Step 504: Obtain position coordinates (X, Y) of a touch point in real time.

Step 505: Obtain a position change (X0, Y0) of the touch point from a first moment to a second moment.

Step 506: Calculate vertical and horizontal coordinates (A, B) of an estimated position of the virtual joystick at the second moment according to the position change (X0, Y0) and coordinates (x1, y1) of the virtual joystick at the first moment.

Step 507: Calculate a distance r between the vertical and horizontal coordinates (A, B) of the estimated position of the virtual joystick at the second moment and the center (0, 0) of a movable area.

Step 508: Determine whether the distance r is greater than a radius R of the movable area.

When r<=R, the following step 509 is performed; and when r>R, the following step 510 is performed.

Step 509: Determine the estimated position (A, B) as an actual position of the virtual joystick at the second moment.

Step 510: Determine coordinates of an intersection of a connecting line between the estimated position and the center of the movable area and an edge of the movable area as the actual position of the virtual joystick at the second moment.

In the foregoing coordinates (x2, y2) of the intersection, x2=R*SIN(arctan(A/B)), and y2=R*COS(arctan(A/B)).

Step 511: Calculate a direction and a distance of the virtual joystick relative to the center of the movable area according to the position of the virtual joystick.

Step 512: Determine a moving direction and a moving speed of a virtual object according to the direction and the distance.

Step 513: Control the virtual object according to the moving direction and the moving speed to move.

The technical solutions provided in this application are compared with the technical solutions provided in the related art below, to further describe the beneficial effects of the technical solutions provided in this application.

Figure 6:
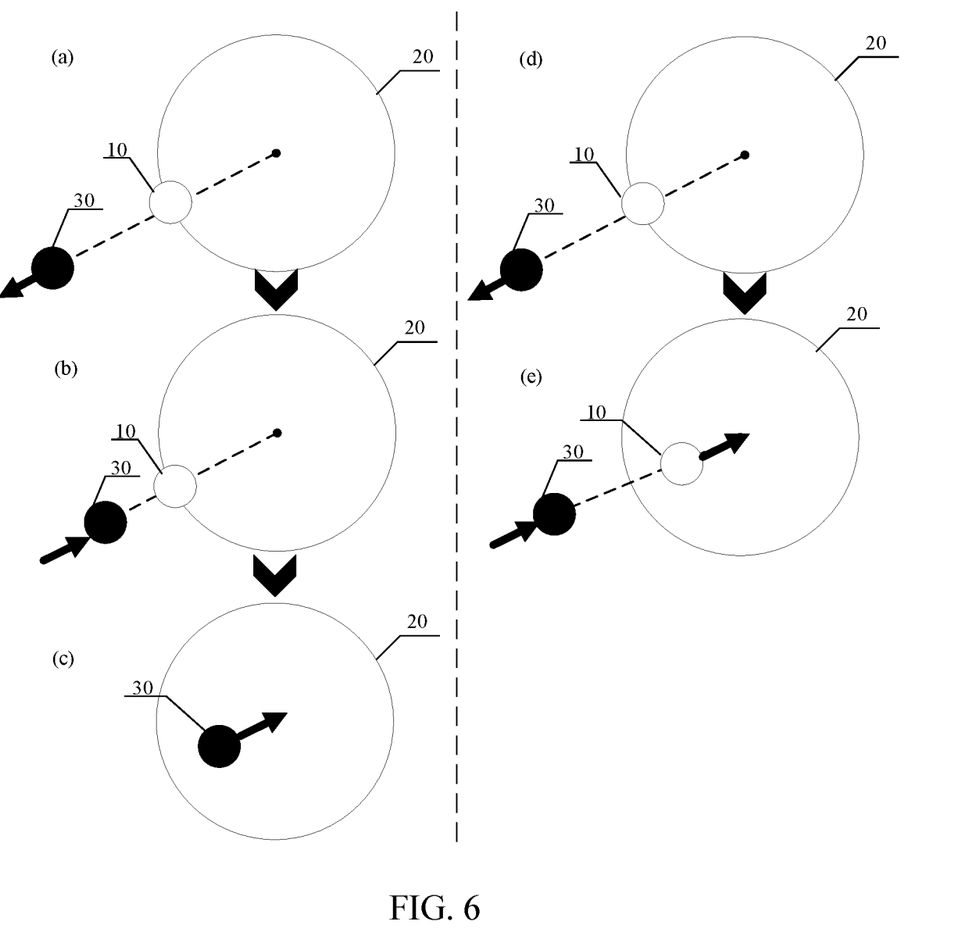
FIG. 6 is a schematic exemplary diagram of reverse movement of a touch point.

FIG. 6 is a schematic exemplary diagram of reverse movement of a touch point. Parts (a), (b), and (c) in FIG. 6 are a technical solution provided in the related art; and parts (d) and (e) in FIG. 6 are a technical solution provided in this application. As shown in parts (a), (b), and (c) in FIG. 6, when a touch point 30 outside a movable area 20 of a virtual joystick 10 moves in a reverse direction, a position of the virtual joystick 10 remains unchanged while the touch point 30 moves to an edge of the movable area 20; and once the touch point 30 moves inside the edge of the movable area 20, the virtual joystick 10 starts to move in a reverse direction. As shown in parts (d) and (e) in FIG. 6, when the touch point 30 outside the movable area 20 of the virtual joystick 10 moves in a reverse direction, the virtual joystick 10 on the edge of the movable area 20 moves in a reverse direction at the same time.

Therefore, compared with the related art, according to the technical solution provided in this embodiment of this application, the direction of the virtual joystick can be quickly changed without the need to reversely compensate for the distance, to further move the virtual object quickly.

Figure 7:
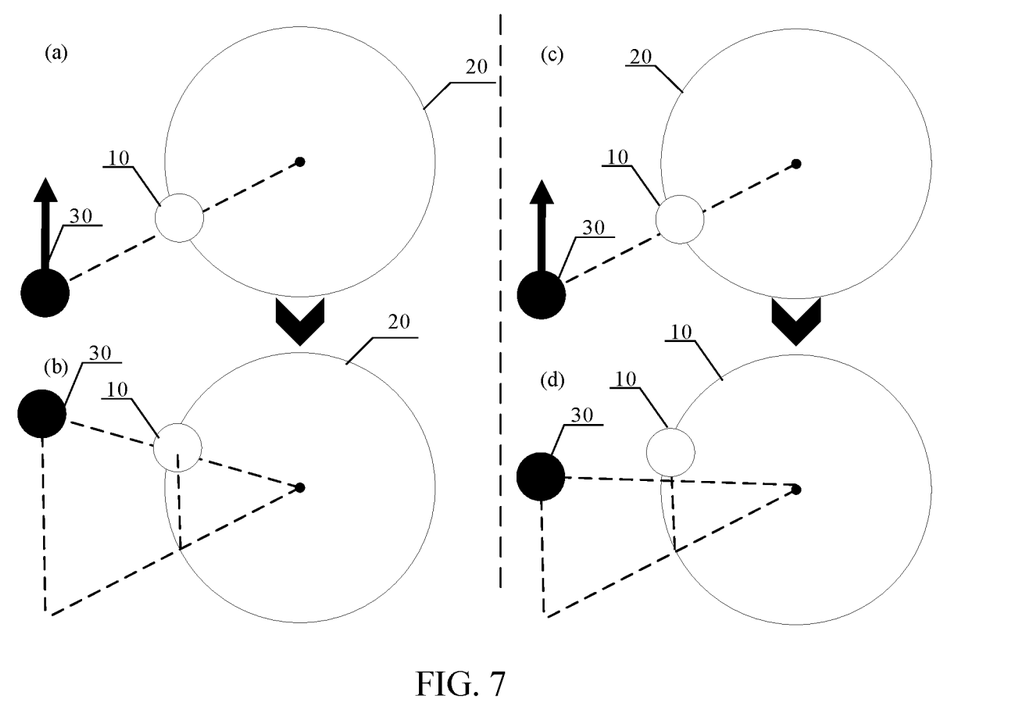
FIG. 7 is a schematic exemplary diagram of vertical movement of a touch point.

FIG. 7 is a schematic exemplary diagram of vertical movement of a touch point. Parts (a) and (b) in FIG. 7 are a technical solution provided in the related art; and parts (c) and (d) in FIG. 7 are a technical solution provided in this application. Through the comparison between part (c) and part (d), it can be seen that when the touch point 30 outside the movable area 20 of the virtual joystick 10 moves upward and the virtual joystick 10 moves by the same distance, a distance by which the touch point 30 needs to move in the technical solution provided in the related art is greater than a distance by which the touch point 30 needs to move in the technical solution provided in this application.

Therefore, compared with the related art, according to the technical solution provided in this embodiment of this application, a moving distance of the touch point is smaller when the virtual joystick moves by the same distance, that is, a swipe distance of the user finger is smaller, which improves the operation efficiency of the user.

In addition, because the position of the virtual joystick and the position of the touch point change synchronously in real time, such as reverse movement and vertical movement, compared with the related art, according to the technical solution provided in this embodiment of this application, a moving distance of the user finger is smaller when the virtual joystick moves by the same distance. Therefore, the user may move the virtual joystick to a position that is convenient for finger operation, and perform touch operations such as rotation, swipe, and pressing at the position, to control movements of the virtual joystick. Therefore, a problem of inconsistent user operation comfort caused by different finger lengths of users can be alleviated.

The following describes apparatus embodiments of this application, which can be used to perform the method embodiments of this application. For details not disclosed in the apparatus embodiments of this application, refer to the method embodiments of this application.

Figure 8:
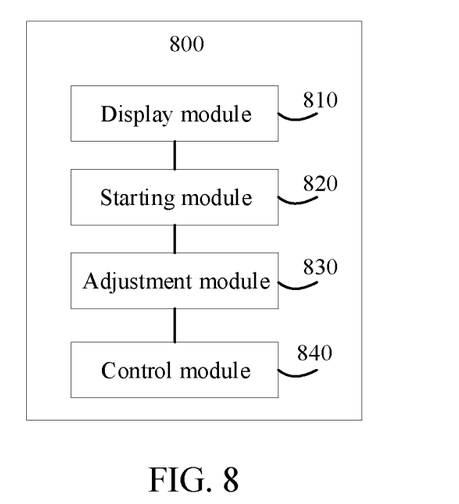
FIG. 8 is a block diagram of an apparatus for controlling movements of a virtual object according to an embodiment of this application.

FIG. 8 is a block diagram of an apparatus for controlling movements of a virtual object according to an embodiment of this application. The apparatus has functions of implementing the foregoing method examples. The functions may be implemented by using hardware, or may be implemented by hardware executing corresponding software. The apparatus may be the terminal described above, or may be disposed on the terminal. The apparatus 800 may include: a display module 810, a starting module 820, an adjustment module 830, and a control module 840.

The display module 810 is configured to: display a target perspective picture of a target application, and superimpose a virtual joystick and a movable area of the virtual joystick on the target perspective picture.

The starting module 820 is configured to start the virtual joystick when a trigger operation corresponding to the virtual joystick is obtained.

The adjustment module 830 is configured to adjust a position of the virtual joystick in the movable area according to a position change of a touch point when the virtual joystick is in an activated state, the position of the virtual joystick and a position of the touch point changing synchronously in real time when the touch point moves within an effective touch range, the effective touch range including and being larger than the movable area.

The control module 840 is configured to control a virtual object according to the position of the virtual joystick to move.

Based on the above, in the technical solution provided in this embodiment of this application, after the virtual joystick is started, the position of the virtual joystick in the movable area is adjusted according to the position change of the touch point. In addition, the position of the virtual joystick and the position of the touch point change synchronously in real time when the touch point moves within the effective touch range. Compared with the related art, when the touch point is outside the movable area of the virtual joystick and the virtual joystick moves by the same distance, the moving distance of the touch point in this application is smaller, which improves operation efficiency of a user.

Figure 9:
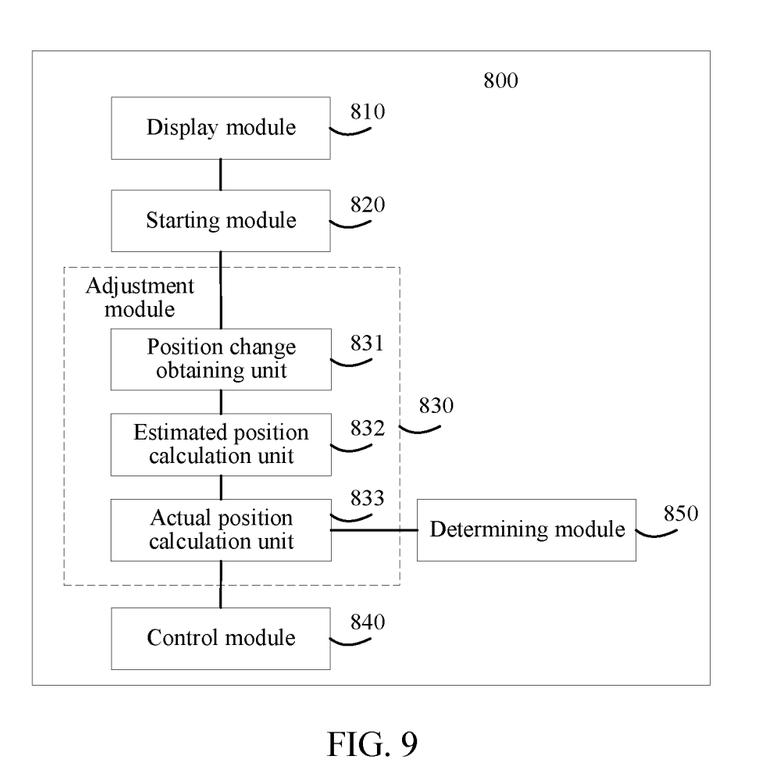
FIG. 9 is a block diagram of an apparatus for controlling movements of a virtual object according to another embodiment of this application.

In certain designs, the adjustment module 830 includes: a variation obtaining unit 831, an estimated position calculation unit 832, and an actual position calculation unit 833.

The variation obtaining unit 831 is configured to obtain the position change of the touch point from a first moment to a second moment.

The estimated position calculation unit 832 is configured to calculate an estimated position of the virtual joystick at the second moment according to the position change and a position of the virtual joystick at the first moment.

The actual position calculation unit 833 is configured to calculate an actual position of the virtual joystick at the second moment according to the estimated position and the movable area when the estimated position is outside the movable area.

In certain designs, the movable area is a circle; and the actual position calculation unit 833 is configured to: calculate coordinates of an intersection of a connecting line between the estimated position and the center of the movable area and an edge of the movable area; and determine the coordinates of the intersection as the actual position of the virtual joystick at the second moment.

In certain designs, the apparatus 800 further includes a determining module 850.

The determining module 850 is configured to determine the estimated position as the actual position of the virtual joystick at the second moment when the estimated position is in the movable area.

In certain designs, the control module 840 is configured to: calculate a direction and a distance of the virtual joystick relative to the center of the movable area according to the position of the virtual joystick; determine a moving direction and a moving speed of the virtual object according to the direction and the distance; and control the virtual object according to the moving direction and the moving speed to move.

When the apparatus provided in the foregoing embodiments implements functions of the apparatus, it is illustrated with an example of division of each functional module. In certain embodiments, the function distribution may be finished by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 10:
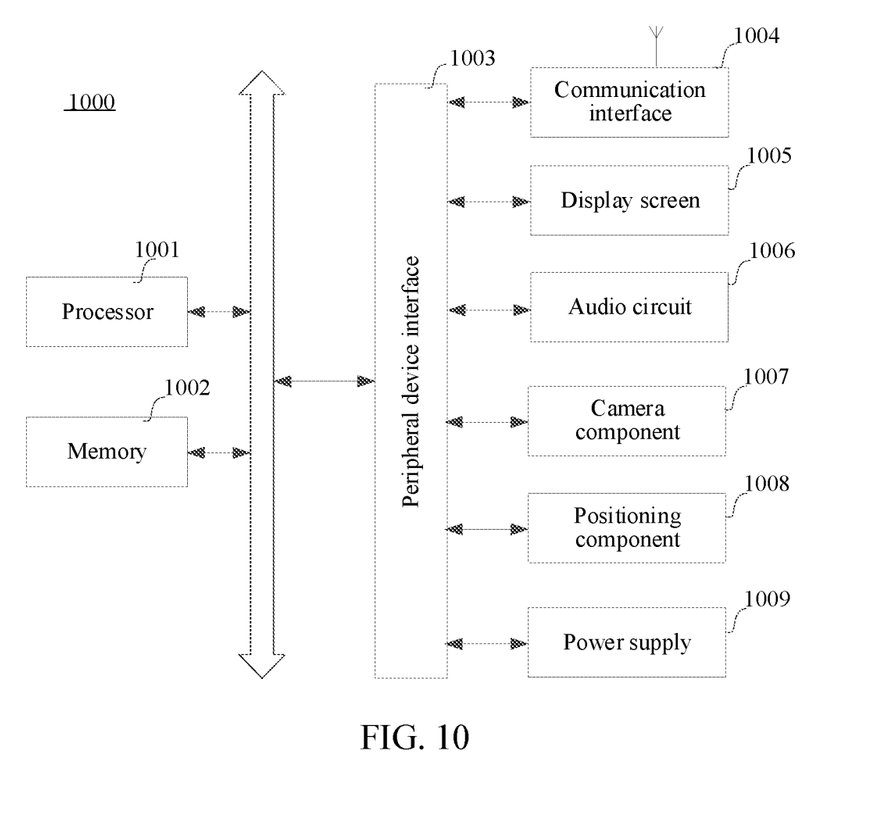
FIG. 10 is a structural block diagram of a terminal according to an embodiment of this application.

FIG. 10 is a structural block diagram of a terminal according to an embodiment of this application. Generally, a terminal 1000 includes a processor 1001 and a memory 1002.

The processor 1001 may include one or more processing cores, for example, a 4-core processor or an 8-core processor. The processor 1001 may be implemented by using at least one hardware form of a digital signal processor (DSP), a field programmable gate array (FPGA), and a programmable logic array (PLA). The processor 1001 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1001 may be integrated with a graphics processing unit (GPU). The GPU is configured to be responsible for rendering and drawing content that a display needs to display. In some embodiments, the processor 1001 may further include an artificial intelligence (AI) processor. The AI processor is configured to process a computing operation related to machine learning.

The memory 1002 may include one or more computer-readable storage media. The computer-readable storage media may be non-transient. The memory 1002 may further include a high-speed random access memory and a nonvolatile memory, for example, one or more disk storage devices or flash storage devices. In some embodiments, the non-transient computer-readable storage medium in the memory 1002 is configured to store at least one instruction. The at least one instruction is executed by the processor 1001 to perform the method for controlling movements of a virtual object provided in the method embodiment in this application.

In some embodiments, the terminal 1000 may optionally include a peripheral device interface 1003 and at least one peripheral device. The processor 1001, the memory 1002, and the peripheral device interface 1003 may be connected by using a bus or a signal cable. Each peripheral device may be connected to the peripheral device interface 1003 by using a bus, a signal cable, or a circuit board. Specifically, the peripheral device may include: at least one of a communication interface 1004, a display screen 1005, an audio circuit 1006, a camera component 1007, a positioning component 1008, and a power supply 1009.

A person skilled in the art may understand that the structure shown in FIG. 10 constitutes no limitation on the terminal 2100, and the terminal may include more or fewer components than those shown in the figure, or some components may be combined, or a different component deployment may be used.

A terminal is further provided in an exemplary embodiment. The terminal includes a processor and a memory, the memory storing at least one instruction, at least one program, a code set, or an instruction set, the at least one instruction, the at least one program, the code set, or the instruction set being loaded and executed by the processor to implement the foregoing method for controlling movements of a virtual object.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing method for controlling movements of a virtual object.

In an exemplary embodiment, a computer program product is further provided, the computer program product, when executed by a processor, being used for implementing the foregoing method for controlling movements of a virtual object.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

"Plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

What is claimed is:

1. A method for controlling movements of a virtual object, applied to a terminal, the method comprising:
  displaying a virtual joystick and a circular movable area of the virtual joystick, the virtual joystick as displayed is smaller in area than the circular movable area;
  moving a touch point from a first touch position (X1, Y1) at a first moment to a second touch position (X2, Y2) at a second moment, the first touch position (X1, Y1) being different from the second touch position (X2, Y2), and both the first touch position (X1, Y1) and the second touch position (X2, Y2) being outside of the circular movable area of the virtual joystick;
  determining a position change of the touch point as (X0, Y0), X0 being X2−X1, and Y0 being Y2−Y1;
  automatically positioning the virtual joystick at a first joystick position (x1, y1) at the first moment, the first joystick position (x1, y1) being an intersection of a line connecting a center of the circular movable area and the first touch position (X1, Y1) of the touch point;
  calculating an estimated position (A, B) of the virtual joystick, A being x1+X0, B being y1+Y0; and
  automatically positioning the virtual joystick at a second joystick position (x2, y2) at the second moment, the second joystick position (x2, y2) being an intersection of a line connecting the center of the circular movable area and an estimate the estimated position (A, B) of the virtual joystick, A being x1+X0, B being y1+Y0.

2. The method according to claim 1, further comprising:
  calculating a distance between coordinates (A, B) of the estimated position of the virtual joystick at the second moment and the center of the circular movable area; and
  determining the second joystick position (x2, y2) of the virtual joystick at the second moment further according to whether the distance is greater than a radius of the circular movable area.

3. The method according to claim 2, further comprising:
  determining the distance is not greater than a radius of the circular movable area; and
  automatically re-positioning the virtual joystick at the estimated position at the second moment.

4. The method according to claim 1, further comprising:
  calculating a direction and a distance of the virtual joystick relative to the center of the circular movable area;
  determining a moving direction and a moving speed of the virtual object according to the direction and the distance; and
  controlling the virtual object to move according to the moving direction and the moving speed.

5. An apparatus for controlling movements of a virtual object, comprising a processor and a memory, the memory storing at least one instruction, at least one program, a code set, or an instruction set, the at least one instruction, the at least one program, the code set, or the instruction set being loaded and executed by the processor to:
  display a virtual joystick and a circular movable area of the virtual joystick, the virtual joystick as displayed is smaller in area than the circular movable area;
  move a touch point from a first touch position (X1, Y1) at a first moment to a second touch position (X2, Y2) at a second moment, the first touch position (X1, Y1) being different from the second touch position (X2, Y2), and both the first touch position (X1, Y1) and the second touch position (X2, Y2) being outside of the circular movable area of the virtual joystick;
  determine a position change of the touch point as (X0, Y0), X0 being X2−X1, and Y0 being Y2−Y1;
  automatically position the virtual joystick at a first joystick position (x1, y1) at the first moment, the first joystick position (x1, y1) being an intersection of a line connecting a center of the circular movable area and the first touch position (X1, Y1) of the touch point;
  calculating an estimated position (A, B) of the virtual joystick, A being x1+X0, B being y1+Y0; and automatically position the virtual joystick at a second joystick position (x2, y2) at the second moment, the second joystick position (x2, y2) being an intersection of a line connecting the center of the circular movable area and an estimate the estimated position (A, B) of the virtual joystick, A being x1+X0, B being y1+Y0.

6. The apparatus according to claim 5, wherein the processor is further configured to perform:
calculating a distance between coordinates (A, B) of the estimated position of the virtual joystick at the second moment and the center of the circular movable area; and
determining the second joystick position (x2, y2) of the virtual joystick at the second moment further according to whether the distance is greater than a radius of the circular movable area.

7. The apparatus according to claim 6, wherein the processor is configured to perform:
determining the distance is not greater than a radius of the circular movable area; and
automatically re-positioning the virtual joystick at the estimated position at the second moment.

8. The apparatus according to claim 5, wherein the processor is configured to:
calculate a direction and a distance of the virtual joystick relative to the center of the circular movable area;
determine a moving direction and a moving speed of the virtual object according to the direction and the distance; and
control the virtual object to move according to the moving direction and the moving speed.

9. A non-transitory computer-readable storage medium, storing at least one instruction, at least one program, a code set, or an instruction set, the at least one instruction, the at least one program, the code set, or the instruction set being loaded and executed by a processor to implement the method comprising:
displaying a virtual joystick and a circular movable area of the virtual joystick, the virtual joystick as displayed is smaller in area than the circular movable area;
moving a touch point from a first touch position (X1, Y1) at a first moment to a second touch position (X2, Y2) at a second moment, the first touch position (X1, Y1) being different from the second touch position (X1, Y1), and both the first touch position (X1, Y1) and the second touch position (X2, Y2) being outside of the circular movable area of the virtual joystick;
determining a position change of the touch point as (X0, Y0), X0 being X2−X1, and Y0 being Y2−Y1;
automatically positioning the virtual joystick at a first joystick position (x1, y1) at the first moment, the first joystick position (x1, y1) being an intersection of a line connecting a center of the circular movable area and the first touch position (X1, Y1) of the touch point;
calculating an estimated position (A, B) of the virtual joystick, A being x1+X0, B being y1+Y0; and
automatically positioning the virtual joystick at a second joystick position (x2, y2) at the second moment, the second joystick position (x2, y2) being an intersection of a line connecting the center of the circular movable area and an estimate the estimated position (A, B) of the virtual joystick, A being x1+X0, B being y1+Y0.

10. The computer-readable storage medium to claim 9, wherein the method further comprises:
calculating a distance between coordinates (A, B) of the estimated position of the virtual joystick at the second moment and the center of the circular movable area; and
determining the second joystick position (x2, y2) of the virtual joystick at the second moment further according to whether the distance is greater than a radius of the circular movable area.

11. The computer-readable storage medium according to claim 9, wherein the method further comprises:
calculating a direction and a distance of the virtual joystick relative to the center of the circular movable area;
determining a moving direction and a moving speed of the virtual object according to the direction and the distance; and
controlling the virtual object to move according to the moving direction and the moving speed.

12. The computer-readable storage medium to claim 10, wherein the method further comprises:
determining the distance is not greater than a radius of the circular movable area; and
automatically re-positioning the virtual joystick at the estimated position at the second moment.

* * * * *